United States Patent

Wolf

[15] 3,681,584

[45] Aug. 1, 1972

[54] CARRY TRANSFER CIRCUIT FOR A PARALLEL BINARY ADDER

[72] Inventor: Gerhard Wolf, Munich, Germany

[73] Assignee: Siemens Aktiengesellschaft, Berlin and Munich, Germany

[22] Filed: Sept. 3, 1970

[21] Appl. No.: 69,308

[30] Foreign Application Priority Data

Sept. 25, 1969 Germany .............P 19 48 604.5

[52] U.S. Cl. ..................................................235/175

[51] Int. Cl. ..................................................G06f 7/50

[58] Field of Search .......................................235/175

[56] References Cited

UNITED STATES PATENTS 3,202,806 8/1965 Menne ..........................235/175

3,437,801 4/1969 Wilhelm, Jr. .................235/175

OTHER PUBLICATIONS

Majerski, Stanislaw; " On Determination of Optimal Distributions of Carry Skips in Adders" IEEE Trans. on Electronic Computers, Vol. EC–16, No. 1, Feb 67, pp. 45– 58

*Primary Examiner*—Eugene G. Botz

*Assistant Examiner*—David H. Malzahn

*Attorney*—Hill, Sherman, Meroni, Gross & Simpson

[57] ABSTRACT

A negated group transfer is provided with the aid of NOR circuits while maintaining a minimum of delay time. A plurality of NOR circuits are assigned to a like plurality of adder stages and each operated by the disjunctive output of the assigned adder stage and the equivalent outputs of all higher value adder stages. An additional NOR circuit is operated by the equivalent outputs of all adder stages and a transfer signal from a lower value group. All NOR circuits have commonly connected outputs to provide a group transfer output to the next group.

3 Claims, 2 Drawing Figures

INVENTOR
*Gerhard Wolf*

BY Hill, Sherman, Meroni, Gross & Simpson ATTYS.

INVENTOR
*Gerhard Wolf*

BY *Hill, Sherman, Meroni, Gross & Simpson*

ATTYS.

CARRY TRANSFER CIRCUIT FOR A PARALLEL BINARY ADDER

BACKGROUND OF THE INVENTION

1. Field of the Invention

This invention relates to a circuit arrangement for the production of a negated group transfer with the help of NOR or NAND circuits wherein a parallel adder is divided into groups, and the group transfer is formed parallel by the NOR or NAND circuits.

2. Description of the Prior Art

To lower the transit time of the transfer with parallel adders comprising several adding stages, the adder is usually divided into several groups. Each such group contains a certain number of adding stages which operate parallel with regard to the operands applied thereto. However, a group transfer then must be produced for each individual group which transfer is extended to the higher-value group, i.e., to the group which processes the higher-value operands. This group transfer can be formed with the help of a parallel transfer network. The transfer network then realizes the transfer equation for parallel transfer production which for four adding states, for example, appears as follows:

$$
\begin{aligned}
\ddot{U}_4 = {} & gh \\
& + ef(g+h) \\
& + cd(g+h)(e+f) \\
& + ab(g+h)(e+f)(c+d) \\
& + \dot{U}o(g+h)(e+f)(c+d)(a+b)
\end{aligned}
$$

wherein $\ddot{U}_4$ is the group transfer for the four-stage parallel adder, *a,b — c,d — e,f — g,h* are the input operands for the individual adding stages and $\dot{U}o$ is the transfer signal from the preceding lower-value group. The transfer $\ddot{U}$ 4 is extended to the next higher-value adder group.

The circuit arrangement for the formation of a group transfer should be constructed in a way that the transit time of the transfer signal is as short as possible. This becomes difficult when the adding stages and the transfer network have to be constructed with the help of NOR or NAND circuits. This is due to the fact that the group transfer signal must necessarily be produced in a negated form. The negation of the transfer signal, which comes from the preceding lower-value group, therefore increases the transit time.

SUMMARY OF THE INVENTION

The primary object of this invention is to provide a circuit arrangement for the formation of the negated group transfer signal with the help of NOR circuits (or NAND circuits) with which the transit time of the group transfer signal is held at a minimum. This objective is realized by an arrangement wherein: a NOR circuit is provided respectively in one group for each transfer signal which is to be processed in parallel; the outputs of the NOR circuits are connected in common with each other; each adding stage is assigned to one NOR circuit respectively; each adding stage is connected, with its output at which the disjunction of the input operands occurs to an input of the NOR circuit assigned to it; a NOR circuit which is not assigned to any adding stage has an input connected to the line for the transfer signal from the lower-value group; each NOR circuit is connected with the equivalent outlets of the adding stage of higher value with regard to the assigned adding stage; and the NOR circuit which is not assigned to any adding stage has individual inputs connected to the respective equivalent outputs of all adding stages. Therefore, for the formation of a group transfer signal, only the transit time of a single negative logic circuit is needed with the circuit arrangement according to this invention.

The output at which the equivalency of the input operands occurs is called the equivalent output of an adding stage: the other output having the disjunction of the operands being called the disjunctive output.

BRIEF DESCRIPTION OF THE DRAWINGS

Other objects, features and advantages of the invention, its organization, construction and operation will be best understood from the following detailed description, taken in conjunction with the accompanying drawings, in which.

DESCRIPTION OF THE PREFERRED EMBODIMENT

Figure 1:
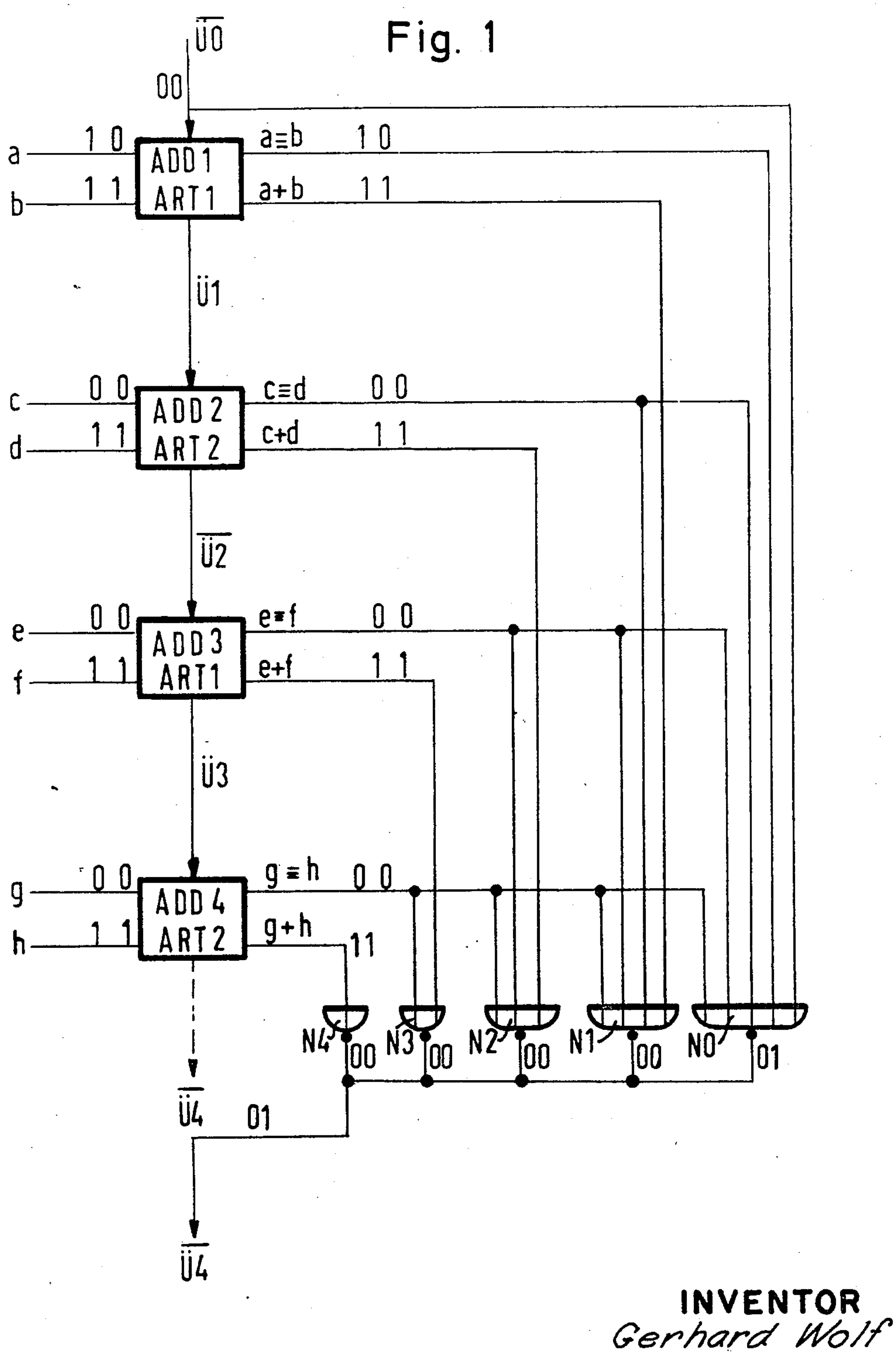
FIG. 1 is a schematic diagram of an adder group circuit arrangement according to the present invention.

In FIG. 1, a schematic block diagram is shown of a group of four adding stages along with the circuit arrangement according to this invention for the formation of a transfer signal. The adding stages are called ADD1 through ADD4, whereby ADD1 is the adding stage to which the lower-value operands are applied. The input operands of the adding stage ADD1 are *a*, *b*, those of the adding stage ADD2 are *c*, *d*, those of the adding stage ADD3 are *e*, *f*, and those of the adding stage ADD4 are *g*, *h*. The transfer signal $\dot{U}$o is also applied to the first adding stage ADD1, which transfer signal comes from the preceding group in negated form. The transfer $\dot{U}$ 1 which comes about within the adding stage ADD1 is extended to the second adding stage ADD2, the transfer $\dot{U}$ 2 which comes about in the second adding stage ADD2 is extended in negated form to the adding stage ADD3, and the transfer $\dot{U}$ 3 which comes about in the third adding stage ADD3 is extended to the adding stage ADD4. The transfer $\dot{U}$4 can be taken off to the next group negated form from the adding stage ADD4. This transmission of the transfer signal from one adding stage to the next is necessary for the formation of a sum. The transit time, however, for the formation of the negated transfer $\dot{U}$4 in this manner is much longer than desired. Due to this, the transfer signal $\dot{U}$4 at the output of the adding stage ADD4 cannot be used as group transfer signal for the next-higher group. The adjacent adding stages are constructed differently one adding stage is of a first type and the next one is of a second type. A preferred construction of the adding stages can be taken from FIG. 2.

The circuit arrangement according to this invention, for the production of a group transfer comprises the NOR circuits NO through N4. The outputs of these NOR circuits N0 through N4 are connected in common with each other with a trunk or bus at which the negated group transfer $\overline{\dot{U}4}$ can be taken off. The number of NOR circuits corresponds to the number of transfers in the adding group which are to be processed in parallel. Each adding stage ADD1 through ADD4 has one NOR circuit respectively assigned thereto. For instance, the NOR circuit N1 is assigned to the adding stage ADD1, the NOR circuit N2 to the adding stage ADD2, the NOR circuit N3 to the adding stage ADD3, and the NOR circuit N4 to the adding stage ADD4. Each adding stage ADD1 through ADD4 is now connected so that one of its outputs at which the disjunction of the input operands occurs (this outlet is designated with the switching function) is connected to an input of each of the NOR circuits N1 through N4 assigned to it. Thus, an input of the NOR circuit N1 is connected to the output $a + b$ of the adding stage ADD1, an input of the NOR circuit N2 is connected to the output $c + d$ of the adding stage ADD2, etc. The NOR circuit N0 which is not assigned to any of the adding stages ADD1 through ADD4 extends, with one of its inputs, to the line for the negated transfer Ü0 of the preceding group. Furthermore, each NOR circuit N1 through N4 is connected to the equivalent outputs of the adding stages of higher value with regard to the assigned adding stage. The equivalent outputs of the adding stages ADD1 through ADD4 are also designated with the switching function. Thus, the NOR circuit N1 is connected to the equivalent outputs of the adding stages ADD2 through ADD4, the NOR circuit N2 to the equivalent outputs of the adding stages ADD3 and ADD4 and the NOR circuit N3 to the equivalent output of the adding stage ADD4. The NOR circuit N0 which is not assigned to any adding stage is connected with the equivalent output of all adding stages ADD1 through ADD4.

The correct function of the circuit arrangement according to this invention can be easily proven with two examples. The binary values which are inserted in FIG. 1 are supposed to be applied to the adding stages ADD1 through ADD4 at the lines for the input operands. Then the values which are also inserted in the drawing appear at the equivalent and disjunction outputs of the adding stages ADD1 through ADD4 in the corresponding order. These values are applied to the NOR circuits N1 through N4. The group transfer Üo of the preceding group is also inserted (in the drawing). The values which are then formed at the outlets of the NOR circuits N0 – N4 are inserted in the correct order in FIG. 1. If these values are inserted into the equation for the transfer Ü4, a transfer will come about in the first example, but not in the second example. If the output value at the trunk of the circuit arrangement according to this invention is compared with this calculated value the input value is negated with respect to the calculated magnitude, i.e. in the case of a binary "0," in the case of two binary "1's." In FIG. 1, the circuit arrangement according to this invention, has been realized with NOR circuits. It is self-evident that the circuit arrangement can also be constructed of NAND circuits.

Beginning with the previous expression for the transfer function Ü4 the following Boolean development illustrates production of a negated group transfer.

$$\ddot{U}_4 = gh + (g\neq h)[_1 ef + cd(e\neq f) + ab(e\neq f)(c\neq f) + \ddot{U}0(e\neq f)(c\neq d)(a\neq b)]_1$$

$$= gh + (g\neq h)[_1 ef + (e\neq f)[_2 cd + ab(c\neq d) + \ddot{U}0(c\neq d)(a\neq b)]_2]_1$$

$$= gh + (g\neq h)[_1 ef + (e\neq f)[_2 cd + (c\neq d)[_3 ab + \ddot{U}0(a\neq b)]_3]_2]_1$$

wherein $$[_1 \ldots ]_1 \quad [_2 \ldots ]_2 \quad [_3 \ldots ]_3$$

are associated and belong together.

The above is negated $$\overline{\ddot{U}_4} = \overline{gh} + (g\neq h)\overline{[_1 \ldots ]_1},$$

where $$[_1 \ldots ]_1 = \overline{ef} + (e\neq f)[_2 \ldots ]_2$$

$$[_2 \ldots ]_2 = \overline{cd} + (c\neq d)[_3 \ldots ]_3$$

$$[_3 \ldots ]_3 = \overline{ab} + (a\neq b)\overline{\ddot{U}0}$$

The transformation is effected according to the sample equation $$\overline{AB + (A\neq B)C} = \overline{AB} + (A\neq B)\overline{C}$$

The transformation may be proven by the following sample calculation

| | | |
|---|---|---|
| $AB =$ | 0 0 0 1 | 0 0 0 1 |
| $(A\neq B)C =$ | 0 0 0 0 | 0 1 1 0 |
| $AB + (A\neq B)C =$ | 0 0 0 1 | 0 1 1 1 |
| which negated $=$ | 1 1 1 0 | 1 0 0 0 $= \overline{AB}$ |
| which divides to $=$ | 0 1 1 0 | 0 0 0 0 $= (A\neq B)\overline{C}$ |
| | 1 1 1 0 | 1 0 0 0 $= AB + (A\neq B)\overline{C}$ |

$$\overline{\ddot{U}4} = \overline{gh} + (g\neq h)\ [_1 \ldots ]_1$$

$$= \overline{gh} + (g\neq h)\ [_1 \overline{ef} + (e\neq f)\ [_2 \ldots ]_2]_1$$

$$= \overline{gh} + (g\neq h)\ [_1 \overline{ef} + (e\neq f)\ [_2 \overline{cd} + (c\neq d)\ [_3 \ldots ]_3]_2]_1$$

$$= \overline{gh} + (g\neq h)\ [_1 \overline{ef} + (e\neq f)\ [_2 \overline{cd} + (c\neq d)\ [_3 \overline{ab} + (a\neq b)\ \overline{\ddot{U}0}]_3]_2]_1$$

$$\begin{aligned}\overline{\ddot{U}4} = {} & \overline{gh} \\ & + \overline{ef}\ (g\neq h) \\ & + \overline{cd}\ (g\neq h)\ (e\neq f) \\ & + \overline{ab}\ (g\neq h)\ (e\neq f)\ (c\neq d) \\ & + \overline{\ddot{U}0}\ (g\neq h)\ (e\neq f)\ (a\neq b)\end{aligned}$$

Inasmuch as the transfer function is to be realized as NOR gates the transformation of the above occurs as $$\overline{\ddot{U}4}=\overline{g+h}$$
$$+\overline{(e+f)}\ (g\equiv h)$$
$$+\overline{(c+d)}\ \overline{(g\equiv h)}\ \overline{(e\equiv f)}$$
$$+\overline{(a+b)}\ \overline{(g\equiv h)}\ \overline{(e\equiv f)}\ \overline{(c\equiv d)}$$
$$+\overline{\ddot{U}}0\ \overline{(g\equiv h)}\ \overline{(e\equiv f)}\ \overline{(c\equiv d)}\ \overline{(a\equiv b)}$$

Figure 2:
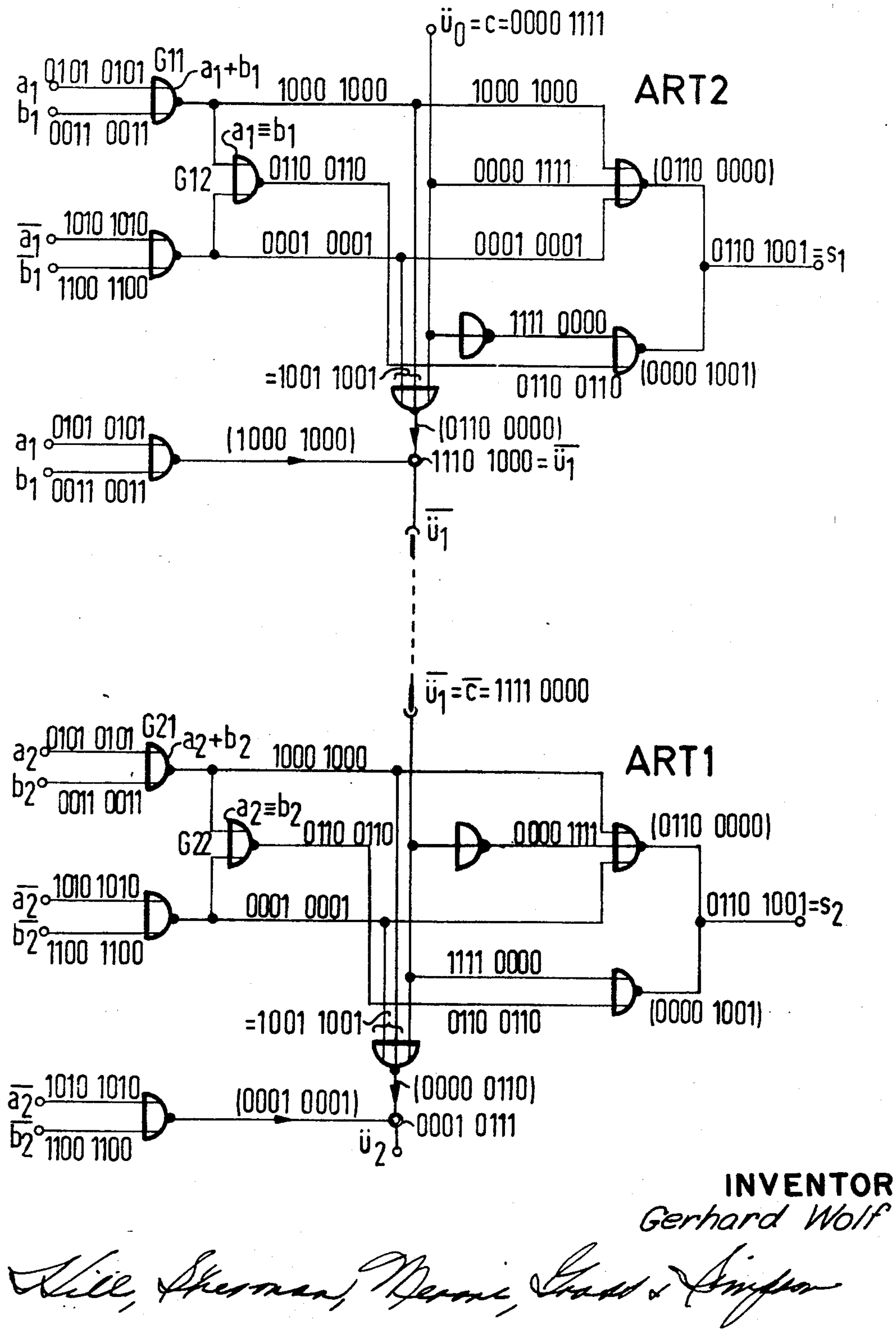
FIG. 2 is a schematic diagram of portions of the adder stages of FIG. 1 illustrated in greater detail.

It is shown in FIG. 2 how adding stages ADD1 through ADD4 can be realized with the help of NOR circuits. The lower circuit corresponds to a first kind of the adding stages, the upper circuit to a second kind of the adding stages. To show better the cooperation of the individual NOR circuits, binary patterns have been entered into the circuits. The input operands are here called ***a*1, *b*1 and *a*2, *b*2, the sum outputs are called S1 and S2 and the transfers Ü0, Ü1 and Ü2. The disjunction of the input operands is provided at an OR output of the NOR/OR circuits G11, G21, and the equivalence of the input operands at an OR output of the NOR/OR circuits G12 and G22. The remaining adding stages of the group correspond to this construction. In FIG. 1**, the group comprises four adding stages. Of course, it is possible to have a larger or smaller number of adding stages than four. The construction of the adding stage can be effected in another manner too. It is only necessary that each adding stage have an equivalent output and a disjunction output of the input operands.

Many changes and modifications may be made in the invention by one skilled in the art; however, it is to be understood that I intend to include within the patent warranted hereon, all such changes and modifications as may reasonably and properly be included within the scope of my contribution to the art.

I claim as my invention:

1. A circuit arrangement for the production of a negated group transfer with the aid of negation type logic circuits with a parallel adder which is divided into groups and the group transfer is formed in parallel, said arrangement comprising: a plurality of adder stages as an adder group, each said stage having an input for receiving a transfer signal from a lower value adder stage, inputs for receiving input operand signals, an equivalent output and a disjunctive output; a corresponding plurality of negation type logic circuits individually assigned to said adder stages and each having an output connected in common with like other outputs of said logic circuits, an input connected to the disjunctive output of the assigned adder stage, individual inputs connected to the equivalent outputs of the adder stages of higher value than the assigned adder stage; and an additional negation type logic circuit having an output connected to the commonly connected outputs of said plurality of logic circuits to provide a transfer output to a subsequent transfer group, an input to receive a transfer signal from a lower value adder group, and a plurality of inputs individually connected to the equivalent outputs of each said adder stage.

2. A circuit arrangement according to claim 1, wherein each said logic circuit is a NOR circuit.

3. A circuit arrangement according to claim 1, wherein each said logic circuit is a NAND circuit.

* * * * *